United States Patent
Brookshire et al.

(10) Patent No.: US 6,591,695 B1
(45) Date of Patent: *Jul. 15, 2003

(54) FLOW METERING DEVICE FOR LANDFILL GAS EXTRACTION WELL

(75) Inventors: Ronald L. Brookshire, Alpine, CA (US); Travis Brookshire, Descanso, CA (US)

(73) Assignee: EFG & E International, El Cajon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/362,952

(22) Filed: Jul. 28, 1999

Related U.S. Application Data

(63) Continuation-in-part of application No. 08/717,959, filed on Sep. 23, 1996, which is a continuation-in-part of application No. 08/646,039, filed on May 7, 1996, now Pat. No. 5,616,841.

(51) Int. Cl.[7] .................................................. G01F 1/42
(52) U.S. Cl. ................................................... 73/861.61
(58) Field of Search .......................... 73/861.61, 861.02, 73/19, 864.73, 861.42, 19.04, 152.29, 861.22, 861.63, 861.04, 861.47, 861.52, 195, 861.03; 166/263, 53; 702/47; 138/44; 128/725

(56) References Cited

U.S. PATENT DOCUMENTS

| | | | | |
|---|---|---|---|---|
| 4,026,355 A | * | 5/1977 | Johnson et al. | 166/246 |
| 4,312,526 A | * | 1/1982 | Cassel | 285/419 |
| 4,444,041 A | * | 4/1984 | Zison | 73/19.04 |
| 4,562,744 A | | 1/1986 | Hall et al. | 73/861.02 |
| 4,719,806 A | * | 1/1988 | Craigen et al. | 73/861.42 |
| 4,757,709 A | * | 7/1988 | Czernichow | |
| 4,844,156 A | * | 7/1989 | Hesh | 166/263 |
| 4,886,119 A | * | 12/1989 | Bernhardt et al. | 166/267 |
| 4,890,672 A | * | 1/1990 | Hall | 166/250.01 |
| 4,896,541 A | * | 1/1990 | Hughes | 73/861.22 |
| 4,918,994 A | * | 4/1990 | Kramer | 73/861.53 |
| 4,946,312 A | * | 8/1990 | Loock et al. | 405/129 |
| 5,063,519 A | * | 11/1991 | Zison | 702/47 |
| 5,127,437 A | * | 7/1992 | Ross, II | 137/614.18 |
| 5,137,026 A | * | 8/1992 | Waterson et al. | 73/861.52 |
| 5,154,083 A | * | 10/1992 | Bernstein et al. | 73/730 |
| 5,209,258 A | * | 5/1993 | Sharp et al. | 137/343 |
| 5,311,662 A | * | 5/1994 | Losser | 29/890.124 |
| 5,458,006 A | * | 10/1995 | Roqueta | |
| 5,462,114 A | * | 10/1995 | Catanese, Jr. | 166/53 |
| 5,468,127 A | * | 11/1995 | Elliott et al. | 417/53 |
| 5,616,841 A | | 4/1997 | Brookshire | 73/152.29 |
| 5,722,417 A | * | 3/1998 | Garbe | 73/861.52 |
| 5,814,735 A | * | 9/1998 | Kurisaki et al. | 73/861.22 |
| 5,842,726 A | * | 12/1998 | Halen, Jr. | 285/148.13 |
| 5,850,946 A | * | 12/1998 | Keller et al. | 222/219 |
| 5,980,466 A | * | 11/1999 | Thomson | 73/861.52 |
| 6,029,527 A | * | 2/2000 | Seitz et al. | 73/861.52 |
| 6,053,055 A | * | 4/2000 | Nelson | 73/861.52 |
| 6,164,142 A | * | 12/2000 | Dimeff | 73/861.61 |
| 6,324,917 B1 | * | 12/2001 | Mack et al. | 73/861.52 |

OTHER PUBLICATIONS

State of the Art of Landfill Gas Recovery. The Controlled Landfill Project, Phase II. By Emcon Associates, 90 Archer Street, San Jose, CA 95112, prepared for Argonne National Laboratories, PG&E Co., and Southern California Gas Co. pp.71–78. Feb. 1981.

* cited by examiner

*Primary Examiner*—Harshad Patel
(74) *Attorney, Agent, or Firm*—John L. Rogitz

(57) ABSTRACT

A coupling having an integral orifice plate engages upstream and downstream segments of a landfill piping system. Upstream and downstream ports are respectively formed through the walls of the coupling adjacent the orifice plate. The difference in pressure at the ports is correlated to a flow rate through the pipe. Sensor fittings are threadably engaged with the ports, and to support the threadable engagement, the wall of the coupling through which the ports are formed has a thickness of at least around one-half inch.

15 Claims, 1 Drawing Sheet

FLOW METERING DEVICE FOR LANDFILL GAS EXTRACTION WELL

This application is a continuation in part of and claims priority from co-pending U.S. patent application Ser. No. 08/717,959, filed Sep. 23, 1996, which is a continuation in part of U.S. patent application Ser. No. 08/646,039, filed May 7, 1996, now U.S. Pat. No. 5,616,841, incorporated herein by reference.

FIELD OF THE INVENTION

The present invention relates generally to landfill metering devices, and more particularly to devices for measuring the flow of gases from landfills through gas extraction wells.

BACKGROUND

Waste products decompose in landfills, and after the free oxygen in the landfill is depleted, the waste product decomposition generates methane gas. It is desirable to recover this methane gas for environmental and safety reasons, and because subsequent to recovery the gas can be used as a source of energy.

Accordingly, systems have been developed to extract the methane. One such system is disclosed in U.S. Pat. No. 5,458,006, which discloses that its system and other such systems typically include a plurality of vertical pipes, referred to as "well casings", that are vertically advanced at various locations into the landfill. The well casings are perforated along their lower-most segment, so that gas from the landfill can enter the casings. A network of horizontal pipes on or near the surface of the landfill interconnects the well casings, with a source of vacuum being in fluid communication with the network of horizontal pipes to evacuate the network and, hence, to evacuate methane gas from the well casings.

It happens that as methane gas is evacuated from a landfill, oxygenated air seeps back in. To avoid adversely affecting the generation of methane, however, the rate of oxygen inflow to the landfill must be controlled. Stated differently, to ensure continued methane gas production, the rate of gas extraction from the landfill and, thus, the rate of oxygen inflow to the landfill must be established to remain below a predetermined flow rate.

Not surprisingly, the methane gas extraction systems mentioned above typically provide for measuring gas flow rate through the well casings. In response to the measured rate, valves in the systems can be manipulated as appropriate to establish a desired flow rate through the well casings.

Several methods exist for measuring gas flow through the well casings. These methods typically involve measuring gas flow through a metering pipe that is in fluid communication with the well casing. One method simply involves measuring pressure at two points of the metering pipe that are longitudinally separated from each other. As is well understood, pressure head is inevitably lost in a pipe between an upstream location and a downstream location, with the magnitude of the pressure head loss being related to the gas flow rate through the pipe. Consequently, the pressure differential between any two longitudinally-spaced points in a pipe can be measured and then correlated to a gas flow rate.

Other methods for measuring gas flow rates through metering pipes include disposing an obstruction such as an orifice or a pitot tube in the pipe and then measuring the pressure differential across the orifice or at the taps of the pitot tube. The pressure differentials are then correlated to gas flow rates in accordance with widely understood principles. The use of orifices advantageously permits the use of relatively short metering pipes, vis-a-vis metering pipes which simply measure head loss.

With particular regard to orifices, the '006 patent mentioned above teaches a metering pipe having an upstream segment and a downstream segment, with the segments being joined by a pipe coupler and with only the uppermost end of the downstream segment protruding through a bushing above the well casing. The remainder of the metering pipe, including an orifice used to generate pressure signals for calculating flow rate, is located in the well casing. As contemplated by the '006 patent, the metering pipe segments are made of polyvinylchloride (PVC), and the coupler is a PVC coupler formed with an internal ridge against which the pipe segments are advanced. The orifice is formed in a separate disc-shaped orifice plate made of plastic or steel which is sandwiched between the ridge of the coupling and one of the pipe segments. Thus, flow through the pipe does not encounter only a flat disc-shaped planar surface of an orifice plate, but the orifice plate circumscribed by the ridge of the coupling which rises from the plane of the plate. The combined effect of the ridge and plate can cause flow turbulence and thus decreased measurement accuracy.

Not surprisingly, therefore, the '006 patent teaches that the pressure taps which are formed in the metering pipe segments upstream and downstream of the orifice must be longitudinally distanced from the orifice plate by distances that are multiples of the diameter of the metering pipe, to ensure accurate flow rate measurement. For this reason, pressure lines must extend through the bushing, requiring modification of the bushing and rather elaborate pressure line-bushing fittings to ensure that gas does not leak between the pressure lines and bushing. As a further undesirable result, it will readily be appreciated that such a structure inhibits easily raising or lowering the metering pipe as might be required, e.g., to compensate for well casing settling. Like the '006 patent, U.S. Pat. No. 4,562,744 to Hall et al. teaches that pressure sensors in an orifice meter must be distanced from the orifice plate such that "minimum swirl or turbulence exists". As recognized by the present invention, however, a metering pipe orifice plate in combination with an internally ridged PVC coupling need not create turbulence. Further, the present invention recognizes that upstream and downstream pressure taps in a metering pipe containing an orifice need not be distanced from the orifice, but may be formed adjacent the orifice, thereby simplifying construction and design of the flow metering device while still ensuring accurate flow measurement.

Still further, the present invention understands that an easy and desirable way to engage flow sensor connectors to the ports of an orifice system is by threaded engagement. However, we have discovered that for some pipe sizes, the wall thickness is not sufficient to securely maintain and/or support the threaded engagement. The present invention addresses this problem.

SUMMARY OF THE INVENTION

A pipe coupling includes a single unitary hollow, preferably PVC body defining a fluid entrance segment and a fluid exit segment. An orifice plate is disposed in the body between the segments. The orifice plate defines an orifice and is made integrally with the body. Thus, the orifice plate and body preferably are one single unitary structure. An upstream port is closely juxtaposed with the orifice plate between the plate and the fluid entrance segment, and a downstream port is closely juxtaposed with the orifice plate between the plate and the fluid exit segment. As intended herein, the ports are configured for engaging respective flow rate metering connectors.

In the preferred embodiment, the coupling defines a longitudinal axis and the orifice defines a center that is distanced from the axis. Preferably, the ports are formed in the PVC body opposite the orifice relative to the axis.

In accordance with the present invention, the ports are internally threaded, to engage threaded flow sensor connectors. To support threaded engagement in the case of smaller couplings, the fluid entrance and exit segments of the coupling can define a first wall thickness, with the body including a port section between the entrance and exit segments and defining a second wall thickness greater than the first wall thickness. The ports are formed in the relatively thick port section. For butt-weld couplings, the port section has the same inner diameter as the fluid entrance and exit segments and a greater outer diameter, whereas for couplings designed to receive pipe segments in a surrounding relationship, the port section has the same outer diameter as the fluid entrance and exit segments, but a smaller inner diameter.

In another aspect, a fluid flow rate metering device includes an orifice plate defining an orifice and a plastic pipe body made integrally with the orifice plate. Threaded upstream and downstream sensor ports are formed in the body upstream and downstream, respectively, of the orifice plate for engaging connectors of a fluid flow rate sensor.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
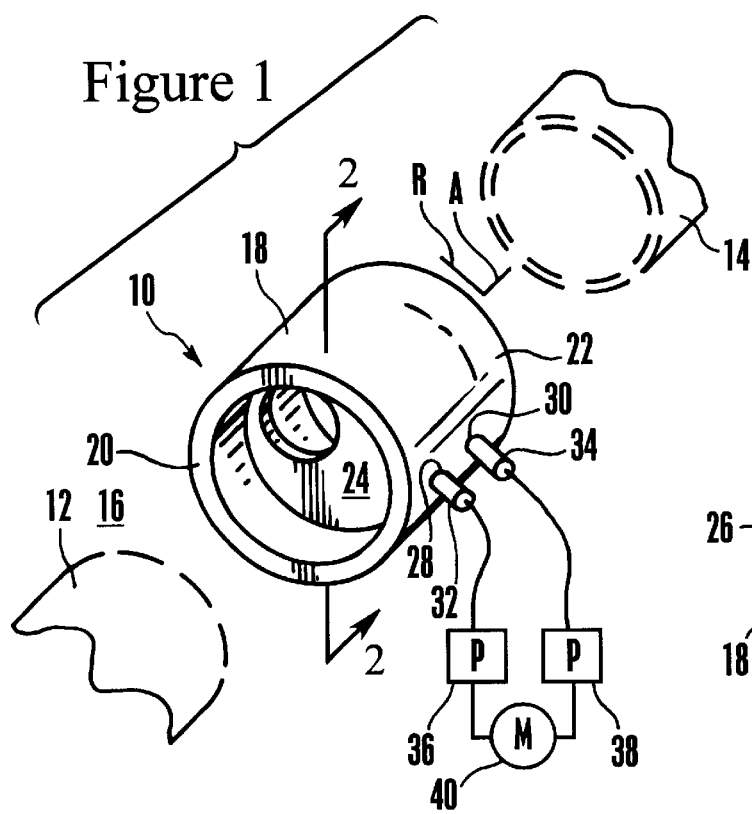
FIG. 1 is perspective view of the present coupling, shown in an exploded relationship with upstream and downstream landfill pipe segments.

Referring initially to FIG. 1, a coupling is shown, generally designated 10, for joining upstream and downstream pipes 12, 14 of a landfill 16 while providing a means to sense fluid flow rate through the coupling 10. The coupling 10 includes a unitarily-molded single piece cylindrical body 18, preferably made of polyvinylchloride (PVC), although high density polyethylene (HDPE), fiberglass, or steel may be used.

As shown in FIG. 1, the body 18 defines a fluid entrance segment 20 and a fluid exit segment 22, with the segments 20, 22 being coaxial with each other. In cross-reference to FIGS. 1 and 2, the particular coupling 10 shown is intended to be butt-welded to pipes 12, 14 that are about 4.5" in diameter and that have cylindrical walls that are about a half inch thick. Accordingly, the segments 20, 22 are butt attachment segments, each having an outer diameter $D_1$ of about 4.5" and a wall thickness $t_1$ of about a half inch.

Figure 2:
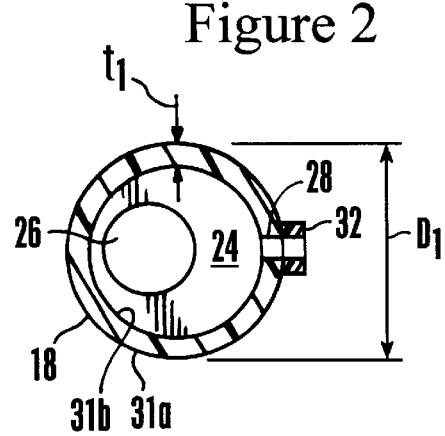
FIG. 2 is a cross-sectional view as seen along the line 2—2 in FIG. 1.

It can be appreciated in reference to FIGS. 1 and 2 that a disc-shaped orifice plate 24 is disposed in the body 18 between the segments 20, 22. The orifice plate 24 defines a preferably circular orifice 26. In accordance with the present invention, the orifice plate 24 is made integrally with the body 18, and the center of the orifice 26 is distanced from the longitudinal axis "A" of the coupling 10 as shown. Thus, the orifice 26 may not be concentric with the orifice plate 24, but can be formed off-center (eccentric) relative to the plate 24, although concentric orifices can be used. In any case, it may now be understood that with the combination of structure shown in FIGS. 1 and 2, a flat planar surface is presented completely across the passageway of the coupling 10 both upstream and downstream of the orifice plate 24. The present invention is thus in contrast to, e.g., the above-mentioned '006 patent, in which the ridge of the coupling overlaps the orifice plate to present an interrupted surface to fluid flow and consequently to cause turbulence and concomitant reduced flow rate measurement accuracy. Still further, the present orifice plate 24 facilitates the close juxtaposition of the ports as described below.

To facilitate sensing pressure on the upstream and downstream sides of the orifice plate 24 (and, hence, to determine fluid flow rate through the coupling 10), upstream and downstream ports 28, 30 are respectively formed in the coupling 10 on opposite sides of the orifice plate 24 from each other. Both ports 28, 30 are formed opposite the orifice 26 relative to the longitudinal axis "A" of the coupling 10. Preferably, each port 28, 30 has a diameter of about one sixteenth of an inch to one quarter of an inch ($1/16"-1/4"$). Importantly, the ports 28, 30 are closely juxtaposed with the orifice plate 24, i.e., the ports 28, 30 are located within a few millimeters of the orifice plate 24, in any case as close as possible to the plate 24. Furthermore, the ports 28, 30 are internally threaded from the outer surface 31a of the coupling inwardly toward, but not completely to, the inner surface 31b of the coupling, for purposes to be shortly disclosed.

Taking the upstream port 28 shown in FIGS. 1 and 2 as an example, the port 28 can define an oblique angle with respect to the radial axis "R" of the coupling 10. Upstream and downstream hollow pressure sensor connectors 32, 34 are threadably engaged with the ports 28, 30 and thus are in fluid communication with the fluid passageway of the coupling 10 upstream and downstream, respectively, of the orifice plate 24. Each sensor connector 32, 34 is respectively engaged with a pressure sensor 36, 38, with the sensors 36, 38 being associated with a flow meter 40 for providing a signal or other indication of fluid flow rate through the orifice 26 by means well-established in the art.

It may now be appreciated that owing to the above-described combination of structure, the ports of the present invention need not be distanced from the orifice plate 24. Instead, the ports 28, 30 are closely juxtaposed with the orifice plate 24 and are integrated into the coupling 10, resulting in a compact structure that establishes the present flow metering function, without deleterious measurement effects due to flow turbulence arising. In other words, the present cooperation of structure avoids the need to distance the ports from the orifice to ensure accurate flow measurement, thereby integrating the flow metering function in a single, easily accessible coupling that does not require pressure line feed-throughs in a well casing bushing or extensively long upstream and downstream piping to reduce flow turbulence.

Furthermore, the pressure sensors 32, 34 are easily accessed for maintenance. Also, owing to the oblique ports 28, 30, forming the ports 28, 30 immediately next to the orifice plate 24 is facilitated. And, as mentioned above the ports 28, 30 are not threaded completely to the inner surface 31b of the coupling, but instead are smooth near the inner surface 31b, such that the pressure sensors 32, 34 do not extend to the inner surface 31b, much less do they protrude into the fluid passageway formed by the coupling. Consequently, the likelihood that matter inside the metering pipe 32 will foul the sensor connectors 32, 34 is reduced.

We have discovered that when the pipes 12, 14 to be joined by the present coupling have the dimensions described above, the uniformly thick wall of the coupling 10 shown in FIGS. 1 and 2 is sufficiently thick to support threaded engagement between the ports 28, 30 and the connectors 32, 34. However, to join, in a butt weld, smaller pipes, e.g., pipes having an outer diameter of about 3.5" and a wall thickness of about a quarter inch or less, while supporting threaded engagement between the ports and the connectors, the coupling 50 shown in FIGS. 3 and 4 advantageously can be used.

Figure 3:
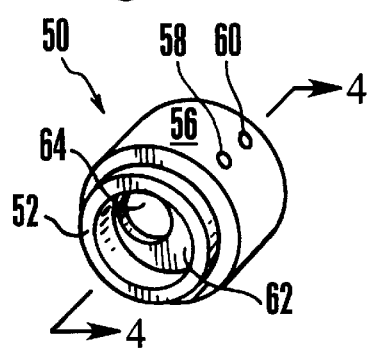
FIG. 3 is perspective view of an alternate coupling for effecting a butt-weld connection between two relatively small pipes.
Figure 4:
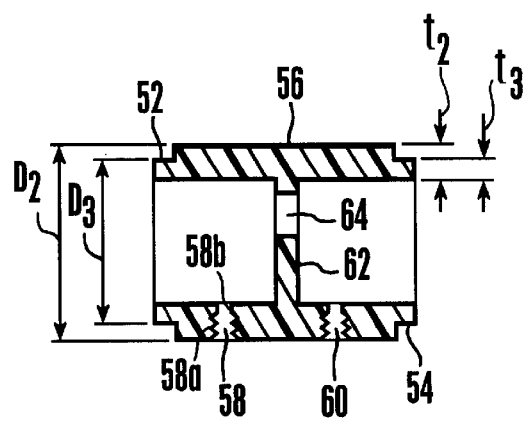
FIG. 4 is a cross-sectional view as seen along the line 4—4 in FIG. 3.

As shown in FIGS. 3 and 4, the coupling 50 is in all essential respects identical to the coupling shown in FIGS. 1 and 2, with the following exceptions. Fluid entrance and exit segments 52, 54 have outer diameters $D_3$ of about 2.5" and wall thicknesses $t_3$ of about 0.2", to facilitate butt welding the segments 52, 54 onto pipes having the same outer diameters and thicknesses. However, in contrast to the coupling 10 shown in FIG. 1, the coupling 50 shown in FIGS. 3 and 4 has a relatively thick port section 56 intermediate the segments 52, 54, with the port section 56 having the same inner diameter as the segments 52, 54 but having a greater outer diameter $D_2$ of about 3.5". Consequently, the wall thickness $t_2$ of the port section 56 is about a half inch, which we have discovered is sufficient to support threadable engagement of ports 58, 60 with threaded connectors. As was the case with the ports 28, 30 shown in FIGS. 1 and 2, taking the port 58 as an example, the port 58 has a radially outer internally threaded bore segment 58a and a smooth radially inner bore segment 58b. An orifice plate 62 having an orifice 64 formed therein is formed within the port section 56 unitarily therewith.

Figure 5:
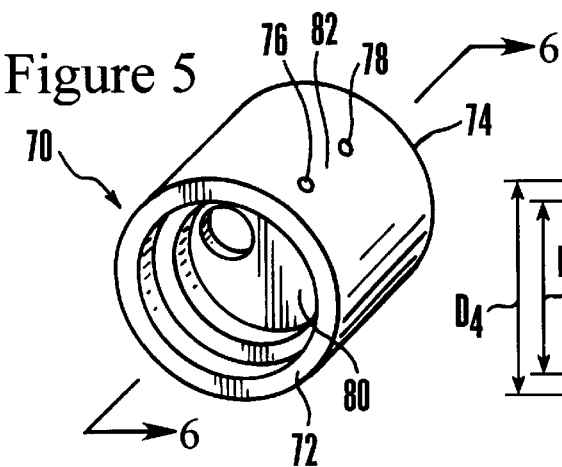
FIG. 5 is perspective view of an alternate coupling for effecting a telescoping connection between two relatively small pipes.
Figure 6:
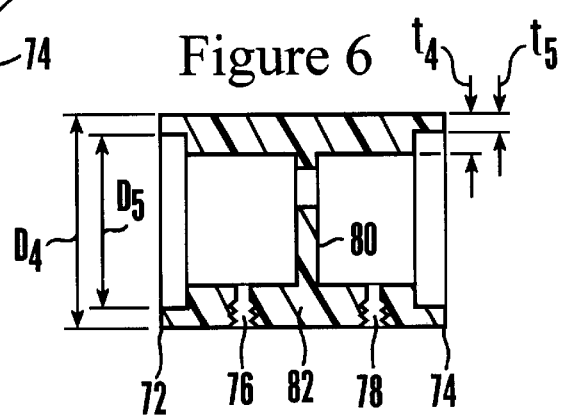
FIG. 6 is a cross-sectional view as seen along the line 6—6 in FIG. 5.

FIGS. 5 and 6 show an alternate coupling, generally designated 70, that is in all essential respects identical to the above-disclosed couplings, with the following exceptions. The coupling 70 is intended to telescopically receive 2.5" pipes instead of effecting a butt engagement. Accordingly, the coupling 70 includes fluid entrance and exit segments 72, 74 having outer diameters $D_4$ of about three inches and inner diameters $D_5$ of about 2.5" for receiving 2.5" pipes therein, leaving the segments 72, 74 with wall thicknesses $t_5$ of about one quarter of an inch. If desired, the inner walls of the entrance and exit segments 72, 74 can be smooth to slidably receive pipes therein, or they can be threaded to threadably engage pipes.

To adequately provide for threaded upstream and downstream sensor ports 76, 78 that straddle an orifice plate 80, a port section 82 is provided intermediate the upstream and downstream segments 72, 74. As shown, the port section 82 has the same outer diameter $D_4$ as the segments 72, 74, but a smaller inner diameter and, hence, a greater wall thickness. Preferably, the wall thickness $t_4$ of the port section 82 shown in FIGS. 4 and 5 is about 0.5".

While the particular FLOW METERING DEVICE FOR LANDFILL GAS EXTRACTION WELL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A pipe coupling, comprising:
   a hollow body defining a fluid entrance segment and a fluid exit segment;
   one and only one orifice plate disposed in the body between the segments and defining an orifice;
   a threaded upstream port between the plate and the fluid entrance segment; and
   a threaded downstream port between the plate and the fluid exit segment, the ports being configured for engaging respective flow rate metering connectors, wherein the coupling defines a longitudinal axis and the orifice defines a center distanced from the axis.

2. The coupling of claim 1, wherein the ports are formed in the body opposite the orifice relative to the axis.

3. The coupling of claim 1, wherein the ports are at least partially threaded.

4. The coupling of claim 3, wherein the segments are butt attachment segments.

5. The coupling of claim 4, wherein the butt attachment segments define a first wall thickness, and the body includes a port section defining a second wall thickness greater than the first wall thickness, the orifice being disposed in the port section, the ports being formed in the port section.

6. The coupling of claim 1, further comprising:
   an upstream flow rate metering connector threadably engaged with the upstream port; and
   a downstream flow rate metering connector threadably engaged with the downstream port.

7. The coupling of claim 6, further comprising a flow rate meter connected to the metering connectors.

8. The coupling of claim 1, wherein the body defines an outer surface and an inner surface, and each port defines a respective radially outer threaded segment extending to the outer surface and a radially inner smooth segment extending to the inner surface, the inner and outer segments of each port being coaxial with each other to establish the respective port.

9. A fluid flow rate metering device, comprising:
   one and only one orifice plate defining a center and an orifice offset from the center;
   a plastic pipe body holding the orifice plate, the body having opposed open ends and a cylindrical sidewall extending therebetween;
   threaded upstream and downstream sensor ports formed in the sidewall of the body upstream and downstream, respectively, of the orifice plate;
   at least one connector engaged with at least one port, wherein the ports are formed in the body opposite the orifice relative to the axis.

10. The device of claim 9, comprising a fluid flow rate sensor coupled to the at least one connector.

11. The device of claim 9, wherein the body defines a fluid entrance segment upstream of the orifice plate and a fluid exit segment downstream of the orifice plate.

12. The device of claim 11, wherein the ports are formed in the body opposite the orifice relative to the axis.

13. The device of claim 11, wherein the segments are butt attachment segments.

14. The device of claim 13, wherein the butt attachment segments define a first wall thickness and a first outer diameter, and the body includes a port section defining a second wall thickness greater than the first wall thickness and a second outer diameter greater than the first outer diameter, the orifice being disposed in the port section, the ports being formed in the port section.

15. The device of claim 9, wherein the body defines an outer surface and an inner surface, and each port defines a respective radially outer threaded segment extending to the outer surface and a radially inner smooth segment extending to the inner surface, the inner and outer segments of each port being coaxial with each other to establish the respective port.

* * * * *